July 24, 1962 P. H. KNOTT 3,045,393
ANIMATED DEVICES FEATURING MAGNETICALLY MOVED PIECES
Filed March 24, 1961 5 Sheets-Sheet 1
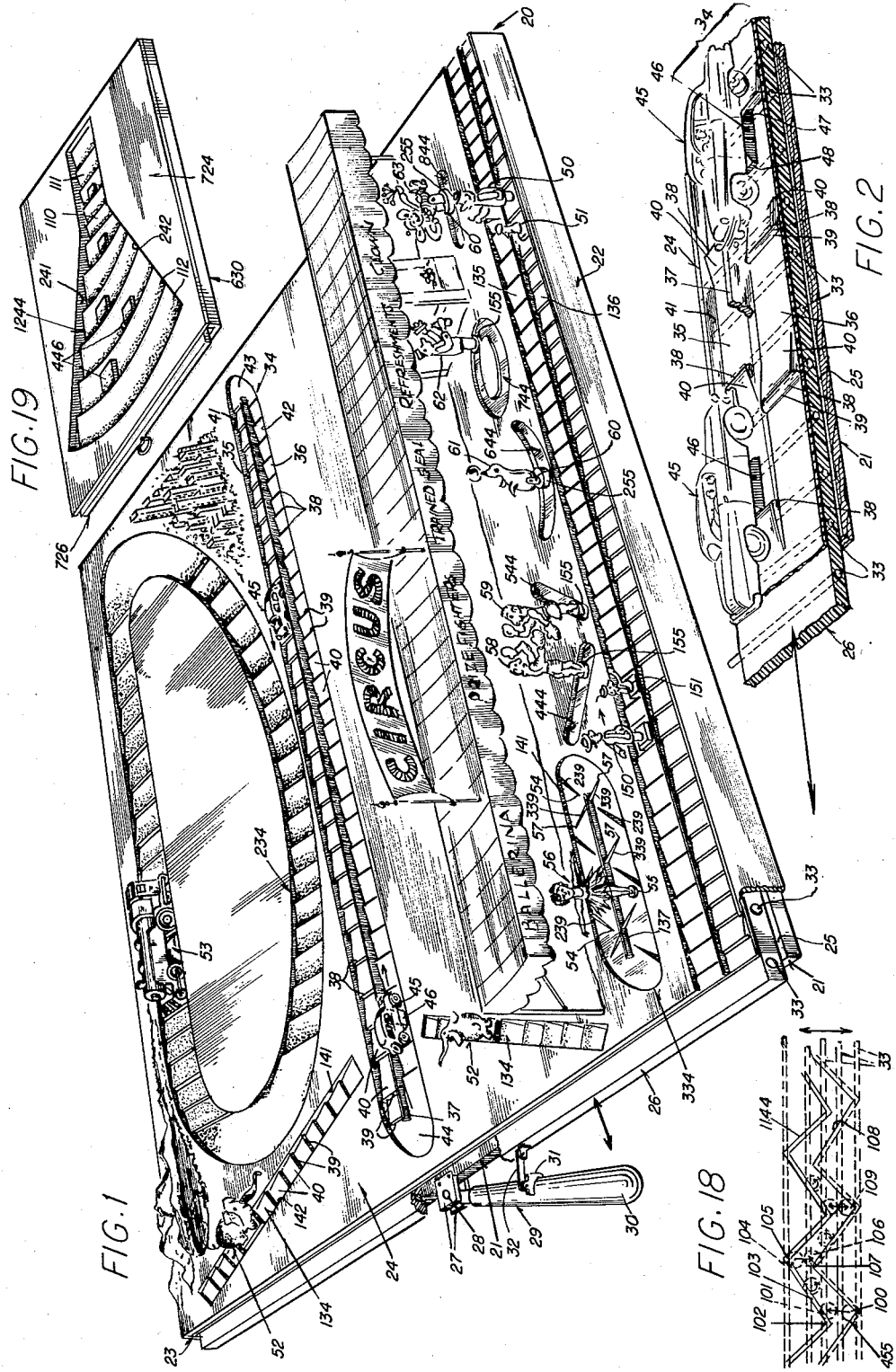

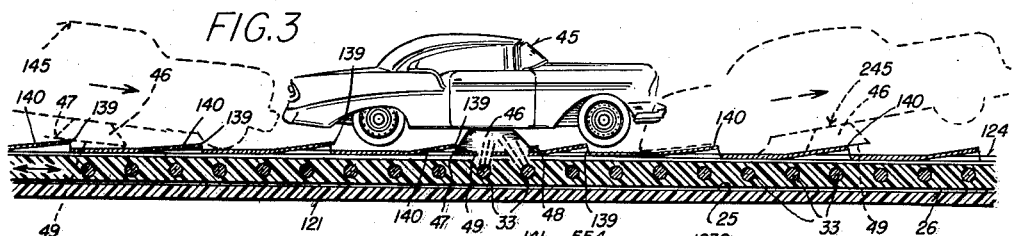

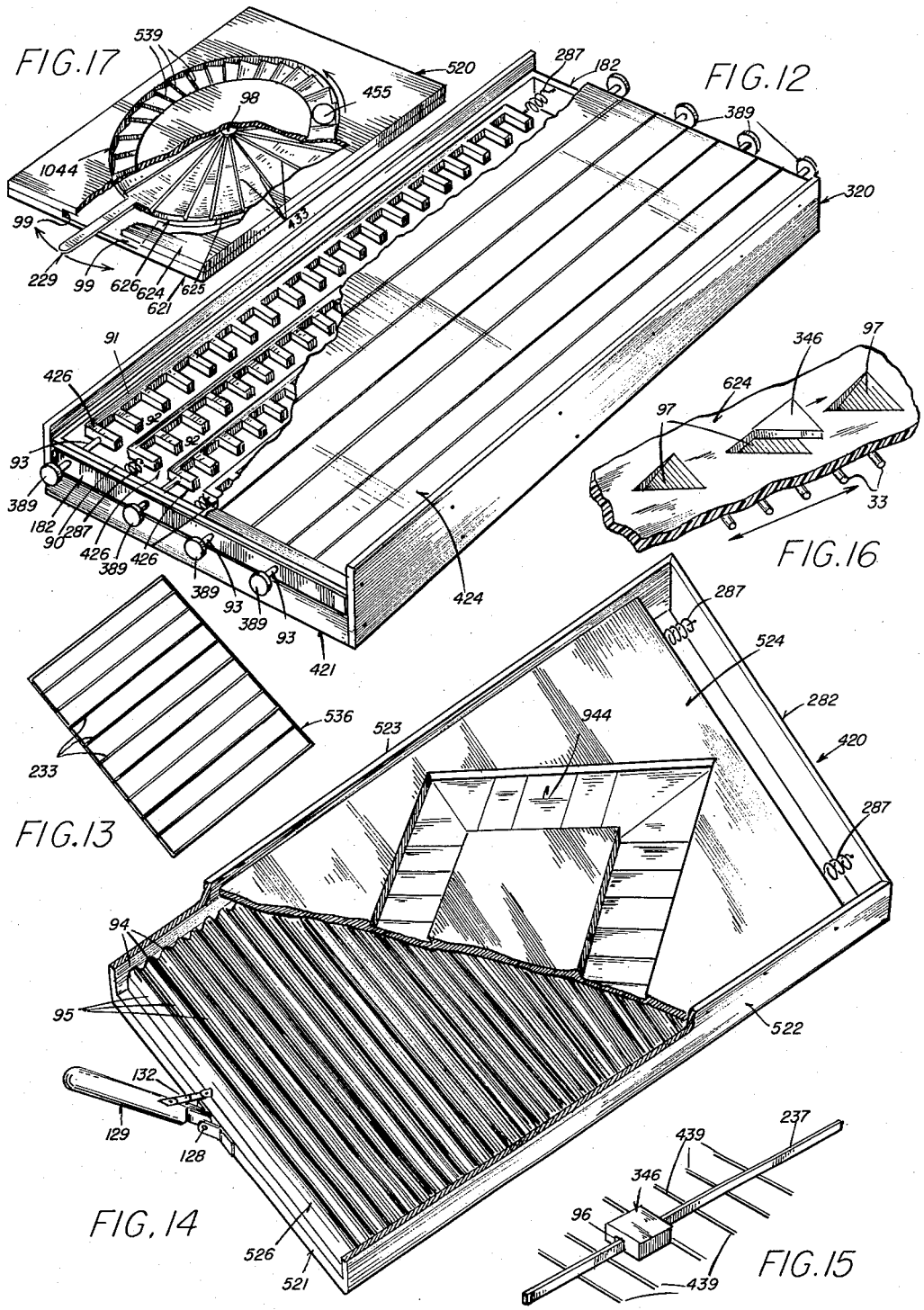

July 24, 1962 P. H. KNOTT 3,045,393
ANIMATED DEVICES FEATURING MAGNETICALLY MOVED PIECES
Filed March 24, 1961 5 Sheets-Sheet 4
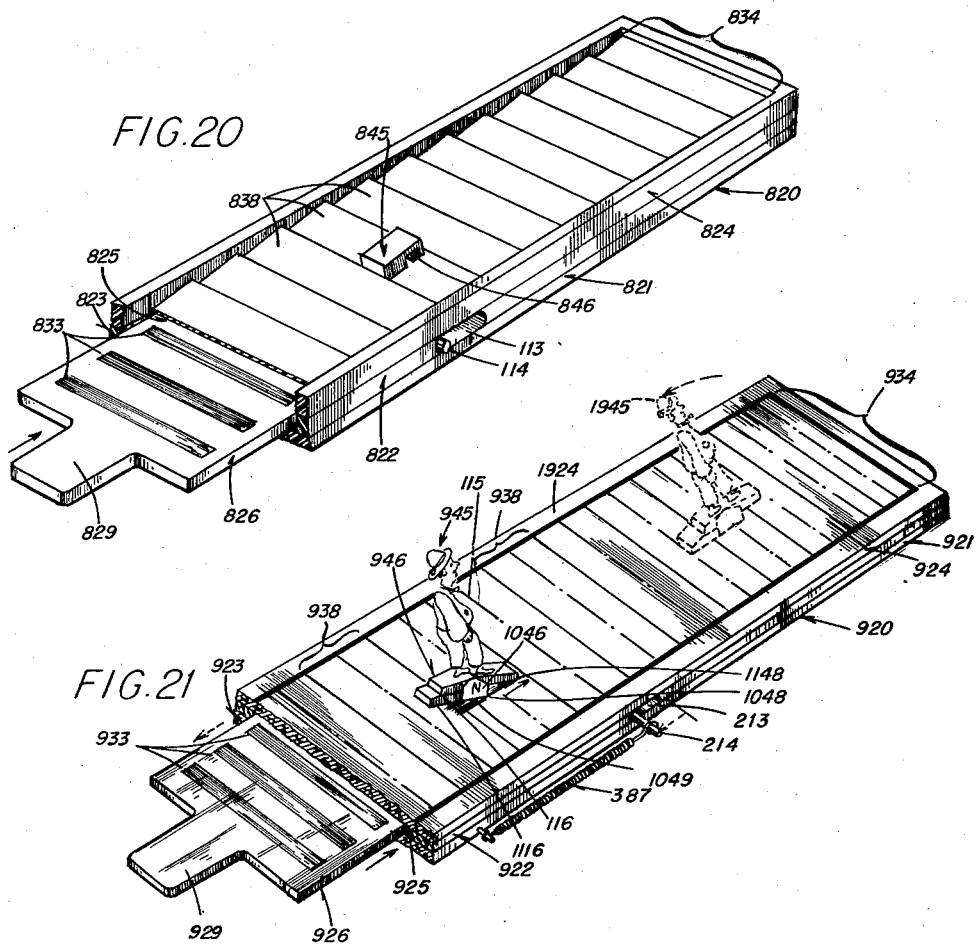
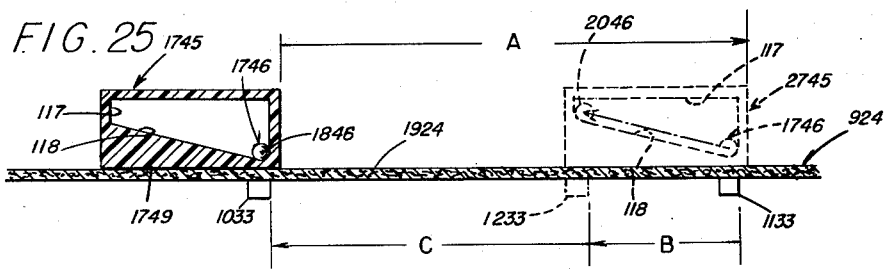
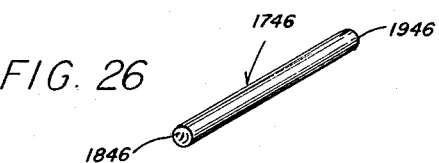

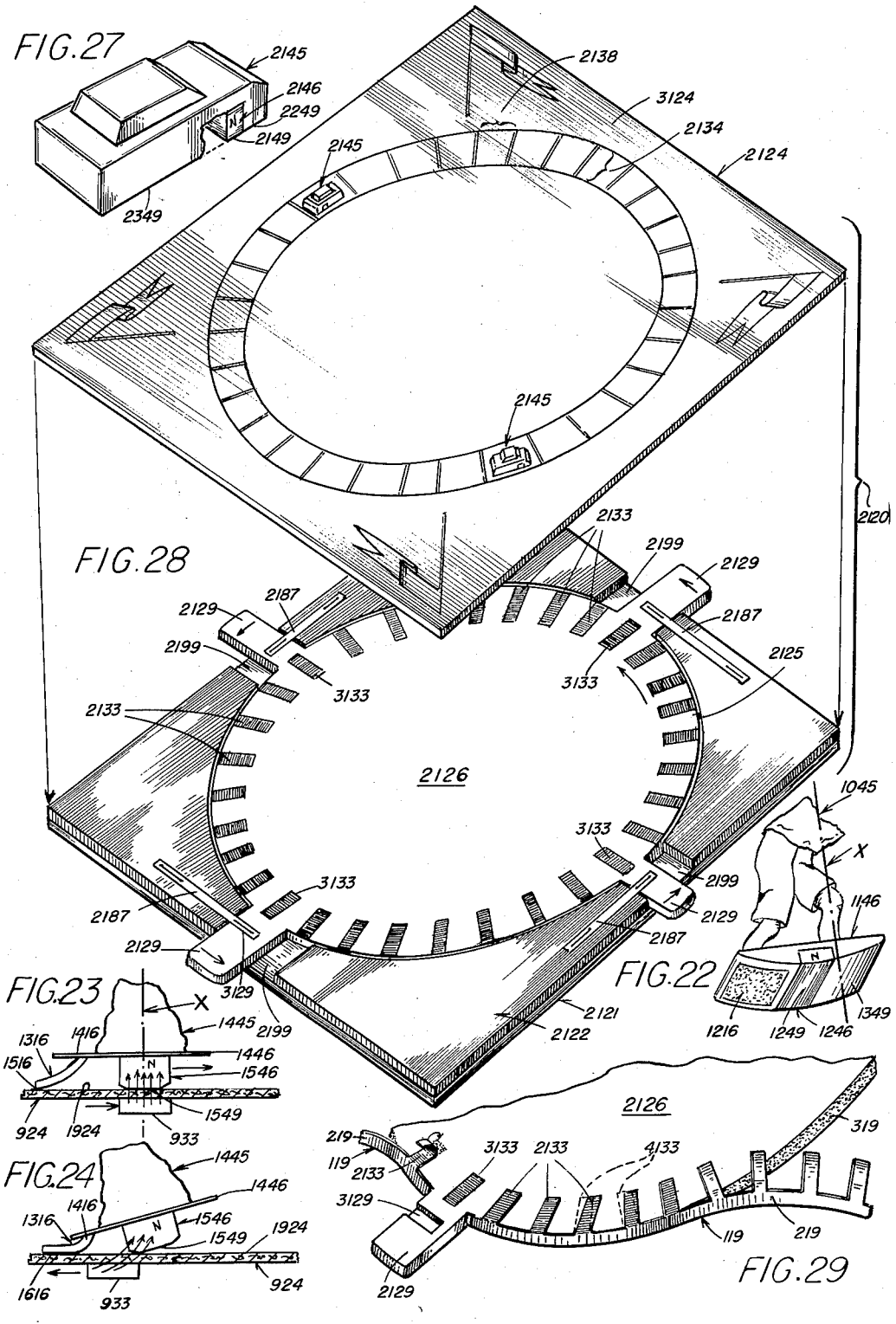

United States Patent Office 3,045,393
Patented July 24, 1962

3,045,393
ANIMATED DEVICES FEATURING MAGNETI-
CALLY MOVED PIECES
Philip H. Knott, 31 W. 88th St., New York, N.Y.
Filed Mar. 24, 1961, Ser. No. 98,275
20 Claims. (Cl. 46—240)

The present invention relates to animated visual devices of the display, advertising and amusement types, and the like, featuring movable pieces manipulated by magnetic control.

This application is in part a continuation of my prior application Serial Number 815,012, filed May 22, 1959, now abandoned.

A general object of the present invention is to provide various readily constructable embodiments of such a device in which animated or movable pieces are effectively given various types of action over a field area along a path of forward motion defined thereon, such action being effected by reciprocation therebeneath of control slide means carrying magnetic areas or elements longitudinally spaced apart in the general direction of the motion path and having attraction affinity for magnetic means carried by the pieces, some embodiments featuring delineated piece paths of motion characterized by motion limiting means which may cause such pieces to be advanced step-by-step in one direction as a result of the simple forth and back reciprocative motion of the control means.

A more specific object of the invention is to provide animated devices of this character, which may be in the form of amusement or game apparatus, in which the lateral field area of each has a top surface on which is defined a path of forward motion of a movable piece having a base slidable along the path and carrying magnetic means, the base being slidably advanced along the path step-by-step by successive attraction to longitudinally spaced apart magnetic areas on a control slide reciprocated therebeneath with cooperative piece motion restricting means of the top surface and the piece base effectively limiting slide of the later generally to forward advance through one step upon each forward travel of the control slide while preventing return slide of the piece base back through the step of advance upon return travel or retraction of the control slide, the magnetic areas of the latter consecutively effecting the successive steps of advance in a unique manner during successive reciprocations of the control slide.

Another object of the present invention is to provide amusement or game devices in which a lateral play field has defined thereon one or more paths of motion of play or game pieces, such paths having associated therewith various types of upstanding means to govern or dictate the action of the pieces in response to reciprocation therebeneath of localized magnetic means.

Yet another object of the present invention is to provide in embodiments of such a device paths defined by a series of succeeding notches which will effectively allow motion of animated pieces therealong in only one direction with reciprocation therebeneath of magnetic means, so as to permit effective progressive advance of such pieces in accordance with a predetermined plan of action.

An additional object of the present invention is to provide in such devices means which produce spinning action of animated pieces or portions thereof during advance motion under the influence of reciprocated magnetic means.

A further object of the invention is to provide forms of the animated device in which retard motion of the slidable base of the movable piece over the top surface of the field area is prevented between successive steps of forward advance by reciprocation of the control slide through effectiveness of frictional engagement of the top surface by the piece base.

The present invention has for another object the provision of animating means and animated pieces which may be efficiently embodied in a great variety of types of games, such as miniature hockey, football, volley ball, basketball, horse racing, car racing, etc., which can be adapted readily to providing play pieces characteristic of a particular amusement device or a game with motion simulating conventional action and permitting, if desired, effective use thereof in competitive game devices.

A still further object of the present invention is to provide structural embodiments of the device which may be readily constructed on an economical and mass production basis and which will permit efficient use and operation thereof.

Other objects of the invention will in part be obvious and will in part appear hereinafter.

The invention accordingly comprises the features of construction, combinations of elements, and arrangement of parts, which will be exemplified in the constructions hereinafter set forth, and the scope of the invention will be indicated in the claims.

For a fuller understanding of the nature and objects of the invention reference should be had to the following detailed description taken in connection with the accompanying drawings, in which:

FIG. 1 is a top perspective view of a miniature circus amusement device in which, by way of example, is employed piece animating features of the present invention;

FIG. 2 is an enlarged perspective detail, with parts broken away and in section, of a twin car track of the type shown in the central portion of the board of FIG. 1;

FIG. 3 is a longitudinal, elevational section of a modified form of the track means illustrated in FIG. 2 and to a larger scale so as to permit ready understanding of the step-by-step advancing action of the animated piece, shown by way of example therein as a toy car;

FIG. 4 is an enlarged top perspective view of a section of a circus play field similar to a portion of that illustrated in FIG. 1 with parts broken away and in section, indicating the action thereon of a play piece having a circular base with guide means providing zig-zag and spin action during advance motion;

FIG. 5 is a top perspective detail, with parts broken away, of an animated play piece which is given both whirling and straight line motion in response to reciprocative action of magnetic means therebeneath;

FIG. 6 is a perspective detail, similar to FIG. 5, of another type of animated piece which may be given whirling, straight line and rocking action by reciprocative magnetic means therebeneath;

FIG. 7 is still another perspective detail of a different type of play piece associated with a different type of track to permit a desired action thereof in response to magnetic means reciprocated therebeneath;

FIG. 8 is an enlarged elevational section, with parts broken away, of the bottom portion of the play piece shown in FIG. 7 illustrating resilient means employed therewith to permit return to erect position during animated action;

FIG. 9 is still another perspective detail of another type of play piece;

FIG. 10 is a top perspective view, with parts broken away and in section, of a modified form of control slide means which may be mounted in the base of the field means or board of the device to permit lateral adjusting motion of a longitudinally-reciprocated control slide;

FIG. 11 is a top perspective view, with parts broken away and in section, of another embodiment of the present invention which may be employed to advantage in game devices where opponents are provided with play pieces representing opposing teams or competitive units and individual control slides;

FIG. 12 is a top perspective view, with parts broken away, of still another embodiment of the present invention in which the device is equipped with a plurality of control slides which may be manipulated by a plurality of competitive players or alternately by an opposing pair;

FIG. 13 is a plan view of a further modified form of control slide which may be in the form of a grid;

FIG. 14 is a top perspective view, with parts broken away and in section, of another type of game device embodying still another form of the present invention with the control slide thereof being in the form of a corrugated structure;

FIG. 15 is a top perspective view of a portion of the field area of an embodiment of the present device showing upstanding guide means of another type associated with a defined step-by-step motion path for an animated piece illustrated therein;

FIG. 16 is a top perspective detail of an area of still another type of field of an embodiment of the present invention in which the play piece motion path is defined by yet another type of means;

FIG. 17 is a top perspective view, with parts broken away and in section, of a further embodiment of the present invention in which the slide control is in a form to be given rotary motion in its reciprocation back and forth, and which may be particularly useful in step-by-step advance of an animated piece along an arcuate or circular path;

FIG. 18 is a top perspective detail of a still further type of field area in which are embodied features of the present invention characterized by zig-zag guide means for the animated piece;

FIG. 19 is a top perspective view of an additional embodiment of the present invention which may be in the form of a game wherein competition between pieces is provided by the design of the field area;

FIG. 20 is a perspective view, with parts broken away, of another embodiment of the device featuring the defiinition on the top surface of the field area of a path of forward motion of a movable piece thereon by a series of successively arranged notches each having an abrupt piece retraction-preventing or motion-blocking upstanding rear wall and a forwardly and upwardly sloping surface or lift wall extending to the top of the upstanding rear wall of the next succeeding notch;

FIG. 21 is a perspective view similar to FIG. 20 of an additional embodiment in which the path of forward motion of a movable piece is defined on the planar and relatively smooth field area top surface merely by printed lines, a movable piece being illustrated in full line position thereon as it is being slidably advanced thereover by forward thrust of the control slide, the movable piece having a rocking base to reduce frictional drag on the top surface during advance by forward control slide thrust and to increase the frictional drag by braking action upon control slide retraction to a degree preventing appreciable return slide of the base, the action of the piece in the latter condition being indicated in dotted lines;

FIG. 22 is a perspective view, with parts broken away, of another embodiment of a movable piece having a rocking base which may be substituted for that illustrated in FIG. 21 for similar braking action;

FIG. 23 is a side elevational view, with parts broken away, of a further embodiment of the movable piece of the types shown in FIGS. 21 and 22, with the rocking base section thereof shown in side elevation and the structure providing the top surface over which it is frictionally dragged being shown in section, and illustrating step advance thereof by forward thrust of one of the series of magnetic elements of the reciprocative control slide therebeneath;

FIG. 24 is a view similar to FIG. 23 illustrating rearward rocking action of the piece base section upon retraction of the control slide magnetic element to effect the braking action which assures prevention of return slide of the advanced piece base section;

FIG. 25 is a longitudinal section, with parts broken away and to enlarged scale, of an additional embodiment of the movable piece which may be advanced step-by-step over the field area of the board device illustrated in FIG. 21 by reciprocation of the control slide, indicating in dotted lines relative positions of parts of the movable piece upon return travel of the one of the magnetic elements of the control slide which advanced it one step and thus provides a degree of disengaging reduction in the magnetic attraction that permits frictional drag to hold the piece in its advance step position;

FIG. 26 is a perspective view of the magnetic element mounted in the movable piece shown in FIG. 25;

FIG. 27 is an enlarged perspective view, with parts broken away, of still another frictional drag type of movable piece which is specifically designed for use with the embodiment illustrated in FIGS. 28 and 29, but which may be employed on the board unit of FIG. 21;

FIG. 28 is an exploded perspective view of a game device embodying a rotary control slide and field area having a smooth surface on which the motion path is printed, illustrating use thereon of the movable piece depicted in FIG. 27; and FIG. 29 is a perspective view, with parts broken away, of the rotary control slide of the device shown in FIG. 28, illustrating a manner of applying to the rotary disc of this control slide the series of longitudinally-spaced magnetic elements or areas.

In the drawings are illustrated different embodiments of the animated device of the present invention which have common unique features. It will be seen therefrom that in the various embodiments, means, such as a base board unit, provides a lateral field area having a top surface on which is defined a path of forward motion of a movable or animated piece. The movable piece has a base resting upon and slidable over the top surface along the path with magnetic means carried by this base relatively close to the top surface of the lateral field area. In the various embodiments are provided cooperative piece motion restricting means on the top surface of the lateral field area and on the base of the movable piece which permits step-by-step forward motion of the piece base over the top surface of the lateral field area through predetermined successive step distances along the defined path while preventing appreciable reverse motion between periods of forward step-by-step motion. These embodiments include a reciprocative lateral control slide located beneath the top surface of the field area with this slide carrying fixed thereon a plurality of successively-arranged, separated and localized magnetic areas each having a localized attraction affinity for the magnetic means carried by the movable piece base, and with these magnetic areas located beneath and spaced in the general direction of the movable piece motion path at distances which are at least equal to each of the predetermined successive step distances. In the board units of these embodiments, means are provided to guide the control slide in reciprocative motion with the localized magnetic areas thereon being alternately moved back and forth along the movable piece motion path. The control slide of each of these embodiments is provided with means to slide it back and forth by alternate forward thrust and return through a distance at least equal to each of the predetermined step distances with the cooperative piece motion restricting means allowing forward advance of the piece base freely over the top surface of the field area through the distance of one of the successive steps upon each forward thrust of the control slide while preventing backward motion of the piece base through this step distance upon reciprocative return of the control slide for maintenance of the piece base in its advance position there to be picked up for a successive step of advance by a succeeding one of the magnetic areas of the control slide on the next forward thrust of the latter.

Referring more specifically to the drawings, in which like numerals identify similar parts throughout, it will be seen, by way of illustration, that an amusement device in the form of a toy circus is shown in FIG. 1 in which is embodied a form of the present invention. Such toy circus is provided with a field unit or board device 20 which may include a lateral base plate 21, side wall strips 22 and 23 and a top field area plate 24, spaced from the bottom plate by the side wall strips to define therebetween a longitudinally-extending slot 25. The longitudinally-extending slot 25, which is defined between the bottom or base plate 21 and the top or field plate 24 of the board device 20, slidably receives therein a control slide 26 to be reciprocated therein forth and back. For this purpose, the front edge of bottom plate 21 may be provided with a pair of apertured, vertically-spaced bracket plates or ears 27, down through which extends a pivot pin 28 rotatably supporting the inner end of a lever 29 having an outer hand grasp or free end 30. Lever 29 carries a bracket 31 linked by a link 32 to the front edge of control slide 26. Thus, when one grasps the free end 30 of lever 29 and swings it back and forth, he will longitudinally reciprocate the slide 26 in the longitudinal slot 25.

Although a variety of types of materials may be employed for production of the parts of the board device 20 and the reciprocative slide 26, it may be preferred to make the top plate 24 and the slide 26 of suitable plastic material, which is particularly adapted to forming and shaping. For example, since the field or top plate 24 is provided with a plurality of shaped areas to define tracks or paths of motion, it may be readily produced by molding a suitable plastic material, such as any one of a variety of types of thermoplastics which after molding and setting have appreciable rigidity, e.g., vinyl resin compositions, etc. Molding the control slide 26 from suitable plastic also facilitates the mount therein of magnetic means hereinafter described. The remaining plate members or board strips may be made from any suitable material, such as hard board, plywood, sheet metal, etc.

In accordance with the present invention, the reciprocative control slide 26 is designed to impose animated action upon the movable pieces slidably resting upon the top surface of the field area. Thus, the reciprocative slide 26 carries magnetic means in the form of laterally separated areas spaced in the general direction of the path of motion of each movable piece. Such localized areas which have magnetic influence with respect to the animated pieces may be in the form of a plurality of elongated rod-like elements 33 of paramagnetic material, e.g., iron rods, which may be embedded in the slide 26 during the molding thereof. It will be understood from FIGS. 1 and 2 that such magnetic elements, in the form of paramagnetic rods 33, may extend across from side-to-side substantially normal to the longitudinal path of reciprocative motion of slide 26, but this is not necessary to effective operation of the device since they may be arranged somewhat obliquely to such path of travel, as will be explained later. It is even possible to employ such localized magnetic means in the form of longitudinally-separated masses of paramagnetic material, which might be in the form of quantities of particulate material, such as iron powder, dispersed in the plastic material from which the control slide is molded in the localized areas spaced in the general direction of the path of motion of a particular animated piece. It will be understood that such magnetic elements having the necessary permeability will have suitable attraction affinity for animated pieces if the latter carry permanent magnets with the former having no magnetic permanence, or this condition may be reversed with the magnetic elements in the control slide being provided in the form of permanent magnets and with the animated pieces being provided with paramagnetic material having no magnetic permanence. It should be apparent that it is simpler to provide each animated piece with a small permanent magnet and to provide the control slide with paramagnetic bodies having attraction affinity therefor.

Let is be assumed that the amusement device 20 is provided with an elongated track area 34 consisting of a pair of parallel or twin tracks 35 and 36 arranged on opposite sides of or flanking an elongated, upwardly-extending guide wall or strip 37. Each of tracks 35 and 36 consists of a plurality or series of upstanding means defined in the top surface of top plate 24, such as by being molded therein, which extend across the general direction of the path of motion defined by the track and spaced a predetermined distance apart along the latter. The series of upstanding means are so formed and shaped as to provide a series of stop abutments 38 defined by a series of certainly spaced, successive notches with each having an upwardly-extending, piece motion-blocking, forwardlly-facing wall 39 and a forwardly-sloping, transverse lift wall 40 extending from the bottom of one notch abutment wall 39 to the top of the next succeeding notch abutment wall. It will thus be understood that although an animated piece may slide forward up over each lift wall 40 to drop down into the next succeeding notch in front of its abutment or stop wall 39, and thus advance step-by-step forwardly from notch to notch, it cannot slide back in the reverse direction since such motion is prevented by the blocking or abutment wall. It will also be noted that preferably the twin tracks 35 and 36 are molded as depressed areas flanked by guiding side walls 41 and 42 so as to assure that each animated piece remains on its track. It will also be seen from FIG. 1 that preferably beyond the ends of the dividing wall 37 the twin tracks 35 and 36 are merged at 43 and 44 with the side wall being curved, so as to guide a play piece from one track (35 or 36) to the other (36 or 35) thereat to permit continuous step-by-step motion first along one track, then across to the other track, then back along the latter and finally across back to the first track.

Each animated piece 45 may be a miniature simulation of an automobile carrying in its base portion, or supported on as a base, a permanent magnet 46. Each magnetic element or body 46 preferably is provided with a rear transverse edge 47, similar to that shown at 48 in FIG. 2, so as securely to abut against each transverse, upstanding, blocking or abutment stop wall 39, as will be better understood from the showing in FIG. 3 wherein such a toy car is shown being slid forward over such a stepped series of abutments.

In FIG. 3 it is suggested that the top panel 124 may be made from a sheet of material which is physically distortable such as a thin sheet of non-ferrous metal, e.g., aluminum, from which a series of lips 140 are dinked upwardly with transverse slitting at the forward end thereof and longitudinal slitting at the sides thereof so that the raised front edge 139 of such lip serves as the transverse abutment or blocking wall. Since the action of the animated automobile pieces 45 are the same for the structure disclosed in FIGS. 1 and 2 and the modified field structure of FIG. 3, it will be understood from the latter that as the control slide 26 is slid forward in slot 25 the magnetic field linking the permanent magnet 46 with one or more of the nearest magnetic elements or paramagnetic rods 33 will cause the automobile simulation piece to move forward with slide of the base bottom surface 49 up over forwardly-sloping lift wall 140 toward the next notch at the abutment lip 139, as is indicated in dotted lines at 145 in the left end of FIG. 3, finally to permit the rear transverse edge 47 of the permanent magnet to drop down in front of this abutment lip in the full line position in the center of FIG. 3. Then, as the control slide 26 is drawn backwards or slid in the reverse direction, the animated piece 45 is held in such forward position by the abutment lip 139 in FIG. 3 or the transverse abutment wall 39 in FIG. 2 until the control slide is again slid forward. Upon control slide 26 being again slid forward in its slot 25, the attraction affinity of the paramagnetic rods 33 nearest the permanent magnet 46 causes the latter to be pulled forward with slide of its bottom surface 49 up the forwardly-sloping lip wall 140, as is indicated in dotted lines at 245 in the right end of FIG. 3. Consequently, each animated or play piece 45 is moved forward step-by-step by reciprocative action of the control slide 26.

It will be seen from FIG. 1 that two parallel tracks 135 and 136, which are similar to twin tracks 35 and 36, may be provided along one side of the field area so as to move therealong any desired animated pieces, preferably in opposite directions by the reversed stepping thereof, as shown, and, for example, such pieces may be representative of a father 50 accompanying his son 51 to the circus with similar pieces 150 and 151 moving in the opposite direction.

It will be noted that in the upper left hand portion of FIG. 1 and on the opposite side of twin tracks 35 and 36 are shown obliquely or diagonally arranged tracks 134 and 134, along each of which an animal simulating piece 52 is moved step-by-step from one abutment 39 to the next, being guided by side walls 141 and 142 in the oblique direction of travel. These oblique tracks 134 and 134 illustrate the fact that the elongated rod-like magnetic elements 33 carried by control slide 26 need not extend substantially normal to the path of motion of an animated piece.

It is illustrated at 234 that such a stepped track may be arcuate or curved while extending in the general direction of the motion of the reciprocative control slide 26 and it is there indicated that such a continuous track may simulate a railroad track on which is running a simulated locomotive 53.

It will be noted that in the lower left hand corner of FIG. 1 is shown an area 334 in the nature of a depressed oval. It will be seen that the depressed area is flanked by an oval upstanding side wall 141 and that the oval depression is centrally provided with an upstanding dividing wall 137. On both sides of the central dividing wall 137 are arranged longitudinally-extending series of staggered, upstanding abutments alternately extending from the side wall toward the central partition wall and from the latter back toward the side wall. It will be seen from FIG. 1 that upstanding abutment wall 239 extends obliquely forward from side wall 141 and is triangular, tapering off to nothing at 54, where it is spaced laterally from the side face of central partition 137 to permit passage threat of the base of a play piece, such as a disc-shaped or circular base 55, which may support any suitable figurine, such as a simulation of a dancing girl 56. The next succeeding abutment wall 339 extends obliquely forward from the side face of upstanding partition 137 at a point beyond that where the piece base 55 will pass beyond the tip 54 of the preceding abutment wall 239, and toward side wall 141 to a point 57 short thereof which permits passage therebetween of the piece base. Such oblique abutment walls 239 and 339 are arranged alternately in zig-zag pattern along the oval track defined outwardly of the central upstanding partition 137, as is shown in FIG. 1. As such a circular piece base 55 is dragged along the upstanding side wall 141 it may rotate due to the frictional engagement of the circumferential edge thereof with the side wall and, consequently, roll along the latter until it strikes oblique abutment walls 239 which diverts it to roll therealong toward the side face of central partition 137. Upon passing the tip 54 of oblique abutment wall 239, piece base 55 may then roll in the vicinity of the side face of the central partition 137 to contract with oblique abutment wall 339, then to be rotated in the reverse direction along the latter while moving toward the side wall 141, finally to pass beyond the tip 57 of this latter abutment wall to be moved forward to contact with the next succeeding abutment wall 239 where its direction of rotation is again reversed. It will thus be seen that the simulating dancing doll 56 will be moved along a zig-zag path, first twirling in one direction and then in the opposite direction. It is to be further understood that this animated piece moves from left to right along the near side of the oval area 334, as viewed in FIG. 1, during the forward stroke of the reciprocated control slide 26, but that it moves from right to left along the far side on the return stroke of the control slide, and it may be desirable to increase the stroke of the latter by obvious means to effect in one stroke thereof the movement of the piece along one side of the oval track from one end entirely to the other end thereof.

If it is desired to advance the spinning ballerina 56 or other figurine on a circular base, such as that shown at 55 in FIG. 1, about an oval field, similar to that shown at 334, in step-by-step fashion, the oblique abutment walls may be varied or supplemented as in the manner proposed in FIG. 4. It is therein indicated that the board may be of similar construction having a top panel 24, and a bottom panel 121 which may be formed also of plastic rather than plywood or fiberboard, as proposed at 21 in FIGS. 1 and 2. The depressed oval area 1334 is defined by an upstanding outside wall 141 similar to that shown in FIG. 1 and is likewise provided with an upstanding central partition strip 137. However, oblique triangular abutment wall 239 has arranged substantially parallel therewith and located forward thereof a supplemental abutment wall 1239, which is of substantially equal height completely across the track between side wall 141 and partition strip 137. Consequently, as the circular base 55 is caused to move from its full line position at 550 by rolling along the face of tapered or triangular oblique wall 239 inward to the position 551 against a side face of central strip 137 during the forward stroke of control slide 26, it may then pass forward beyond tip 54 of this triangular oblique wall, possibly in edge contact with the face of the central strip so as to reverse its direction of rolling or spinning action, dropping down in front of oblique abutment or stop wall 1239 and finally at position 552 to contact of the next triangular wall 339, which is arranged obliquely in the opposite direction. If at this point the forward stroke of the control slide 26 has been completed and it is then pulled back, the circular base piece 55 will move backward from its position at 552 toward its position at 551, but will strike against the forward face of the oblique stop wall 1239 then to be rolled along the face thereof from the vicinity of the central upstanding strip 137 outward toward the side wall 141 substantially to the position indicated at 553. Then upon the next forward stroke of the control slide 26, the circular base piece 55 would then move forward from its position at 553 to a forward position, such as that indicated at 554, perhaps rolling along the side face of wall 141, and after passing the tip 57 of oblique triangular wall 339 will fall down to position 555 in front of stop or abutment wall 1339 which also is of substantially equal height across the track. If the forward stroke of the slide 26 has not been finished, the base piece 55 would then slide further forward until it struck the next triangular oblique wall at position 556, which corresponds to position 550. If the next return stroke of the slide 26 then immediately takes place, the circular base piece 55 would slide back to position 555 to be stopped against the oblique abutment wall 1339 and then be rolled therealong toward the central upstanding strip 137, such as to position 557. Or if the forward stroke of the control slide 26 had been continued the circular base piece 55 would have been rolled inward along oblique triangular wall 239 from position 556 to position 553. On the next forward stroke of the control slide 26, if the circular base piece 55 is in its position at 557, it would then be slid forward, perhaps again being rotated against adjacent face of the upstanding strip 137 as in the case of its movement from its position 551 to its position 552, such as to position 558; and in either case it would then be slid forward from position 558 to be dropped down in front of the next oblique forward wall 1239. It will thus be seen that considerable criss-crossing, zig-zagging and spinning in both directions of such a circular base piece 55 may be attained on a field area of the type illustrated at 1334 in FIG. 4.

It will be noted from FIG. 1 that there may be defined in the top surface of the field area, elongated, obliquely-arranged slots or depressed areas, such as those indicated at 444 and 544, each of which has disposed therein a circular piece base portion 155, which may support any desired figure simulation. As is indicated in FIG. 1, the elongated, obliquely-arranged depressed areas 444 and 544 may be directed in opposite directions with the animated pieces 58 and 59 representing boxing opponents which will move relative to each other to simulate sparring when their bases 155 and 155 are rolled along side walls of the oblique depressed areas 444 and 544.

It is also indicated in FIG. 1 at 644 that such an elongated depressed area may be arcuately shaped and along which a circular base portion 255 may roll in the reciprocation of the control slide. The circular base portion 255 may carry a pair of laterally-spaced support means 60, which pivotally support therebetween a figure 61, that may, for example, simulate a seal balancing a ball on the tip of his nose, and which may be held upright by a weighted bottom extending below the pivot point with the pivoting permitting swinging animated action. At 744 it is indicated that the depressed track may be oval in shape to permit roll therearound in the reciprocating motion of the control slide of a circular base 155 which may carry a figure 62 simulating a refreshment stand attendant. Longitudinal slot 844 may permit motion therein of another circular base 255 having a pair of supports 60 pivotally supporting a figurine 63 which may simulate a clown that rocks back and forth during spinning motion along the path defined by the elongated slot.

It will be understood from FIG. 5 that the animated piece in the form of a figurine 64 may be rotatably mounted upon its circular base 355. For this purpose, the latter may have a pin or rod 65 fixed in the top surface of the circular base and extending upwardly therefrom through the figurine 64 to carry on its top end at 66 above the figurine a simulation, for example, of a lariat loop 67 which will be twirled in the rotation of the circular base along the side wall of the elongated depressed slot 444. In order to prevent the figurine from spinning with the central shaft 65 so as to provide relative whirling action between the figurine 64 and the lariat loop 67, the figurine may be associated with suitable guide means along the side of the path-defining slot 444, which will prevent its rotation. Such guide means may be in the form of a supported rail 68 which rides in a hole extending through the figurine or a slot 69 provided in one side thereof.

FIG. 6 illustrates the rocking action of a pivoted figure 70 which is supported upon upwardly-extending members 160 simulating his arms and carried by circular base portion 255 slidably and rotatably located in elongated, depressed path-defining slot 444. Such figure 70 and its rocking action are similar to those of the figurines shown at 61 and 63 in FIG. 1.

Since embodiments of the present invention may be incorporated in amusement devices which are designed for games of a type simulating action upon a football field, a play piece 71 is shown in FIG. 7 simulating a football player to be moved step-by-step along a stepped track 235. Base portion 146 may be a permanent magnet carrying a pair of upwardly-extending apertured lugs 72, which pivotally support the bottom end of the figurine. In order that the latter may have some action about the pivotal mounting thereof to the lugs 72 while remaining generally upright, suitable resilient means may be provided, as is indicated in FIG. 8, to perform this function. For example, elongated helical spring 73 may have its upper end 74 socketed in a bore 75 in the figurine and its lower end 76 socketed in a bore 77 in the base portion 146. Such elongated spring will permit back and forth swaying action of the figurine 71 about the pivotal connection thereof to the base portion while tending to return it to the erect position.

In FIG. 9 is illustrated a further simulation 78 of a football player which is supported by one upstanding member 79 mounted on the base portion magnet 246 and having pivotal connection at 80 to the body from which depends an integral member 81. The members 79 and 81 simulate legs and the body will swing back and forth with the leg 81 having pendulum action to simulate kicking during start and stop motion in its step-by-step travel along its path.

In FIG. 10 is illustrated at 120 another embodiment of an animated device having a frame defined by a base plate 221, side walls 122 and 123, a top plate 224 defining a field area, and an upstanding back wall 82 together defining a recess or slot chamber 125. In the slot chamber or recess 125 are mounted a plurality of transversely-extending rods 83 having their ends supported by the side walls 122 and 123. An elongated bed plate 84 is provided with depending apertured lugs 85 which slidably receive therethrough these transverse rods 83 for lateral shifting of the bed plate. Reciprocative control slide 126, carrying a series of spaced magnetic elements 33 is slidably supported upon the bed plate 84 with a bracket 86 on the back end of the latter serving as an anchorage for one end of a helical tension spring 87 having its other end connected at 88 to the back end of the control slide. The front end of the slide 126 carries a manually engageable knob 89. Consequently, one may, by grasp of the knob 89, pull the slide forward against the tension of spring 87, and upon release of the knob the spring will pull the slide back so as to give it reciprocative action. Reciprocative control slide 126 may be moved with its bed plate 84 laterally of the frame upon transverse rods 83 so as to locate its magnetic elements 33 beneath any particular longitudinal zone of the field area for animating pieces slidably mounted in such zone.

It is indicated in FIG. 11 that an embodiment of the present invention may be incorporated in a game device which is designed for competitive operation by two opposing players. Such device 220 defines between its base plate 321 and its top plate 324 a longitudinally-extending through slot 225 in which are slidably mounted a pair of control slides 226 and 326 having their opposed ends connected together by tension springs 187. Thus, as one player grasps manual knob 189 to hold his control slide 226, the other player may pull on his control knob 289 to slide his control slide outwardly against the biasing action of tension springs 187 so as to cause the magnetic elements 33 of his slide to give to play pieces on his area of the field certain action which the other may attempt to modify to some extent by varying the position of his own control slide while also attempting to cause his pieces to perform opposing action. It will be noted that slide 226 has its magnetic elements 133 arranged obliquely while extending generally transversely thereof so as to illustrate that practice of the present invention is not limited to arrangement of the magnetic slide elements exactly normal to the path of reciprocative travel.

In FIG. 12 is illustrated at 320 a further embodiment of the present invention in a device which is provided with a large number of controls designed to be manipulated either by a plurality of manipulators or players or successively by opposing players. It will be noted that between base plate 421 and the top field area plate 424 are arranged a series of longitudinally-extending control slides 426. In this embodiment the back and the front end of the slot in which the control slides are to be reciprocatively moved are closed off by end walls 182 to define a closed chamber 90 in which are slidably mounted the plurality of control slides 426. Each control slide 426 is in a form simulating a comb, having an elongated body 91 from which laterally extends longitudinally-spaced teeth or fingers 92 which serve as the longitudinally-spaced magnetic elements. Each control slide 426 has its back end anchored by a helical tensioning spring 287 to one of the end walls 182 and with its other end provided with an operating pull shaft 93 which extends out through a hole in the other end wall to carry beyond the latter a manual control knob 389. It will be seen from FIG. 12 that the control slides 426 are arranged in alternate fashion with one being manually reciprocated from one end of the device and the next from the other end. Thus, an opponent at one end may manipulate any one of four control slides and the opponent on the other end can do likewise with respect to intervening slides so as to move pieces over the field area in a variety of manners.

FIG. 13 illustrates that the slide may be in the form of a grid having a rectangular frame supporting transversely-extending, longitudinally-spaced magnetic elements which may be in the form of rods 233.

FIG. 14 illustrates at 420 a modified form of device embodying features of the present invention having a field-defining top plate 524 supported between the side walls 522 and 523 which may be made integral with the base plate 521. Back wall 282 may have anchored thereto a pair of tensioning springs 287 which are connected to the back end of control slide 526. As shown in FIG. 14, the control slide 526 may be in the form of a corrugated sheet of paramagnetic material having the top crowns 94 of its transversely-extending ribs 95 serving as the longitudinally-spaced, transversely-extending magnetic elements to be reciprocated back and forth. Corrugated sheet control slide 526 is pulled forward by manual lever 129 pivotally connected at 128 to the base plate 521 and linked at 132 to the front edge of the corrugated control slide, return travel being effected by springs 287 when the handle is released. The depressed area 944 may be in the shape of a diamond for use in playing a game simulating baseball.

FIG. 15 illustrates that side walls flanking track areas may be dispensed with if a piece base portion or the magnet thereof 346 is provided with a slot 96 extending from end-to-end in the bottom face thereof so as to slide along the upstanding guide rail or wall strip 237, which is arranged above the series of path abutments 439.

FIG. 16 illustrates the fact that it is not essential that a track be defined by a depressed area having either side walls or a central guide rail. It is therein indicated that the top plate 624 defining the field area may be provided with a series of depressed pockets 97 which have their bottoms sloping upwardly and forwardly to the top surface of the field area plate. In such case the pockets should be shaped in outline similarly to the shape of the animated piece 346, which is by way of illustration shown to be triangular. With the pockets 97 arranged in a straight line and with the path of reciprocative motion of the control slide or its magnetic elements 33 being parallel to the path defined by the series of pockets, the play piece 346 will be caused to slide up out of one pocket and forward to the next to drop down thereto, there to remain until the next reciprocative stroke of the control slide, for step-by-step advance along the path defined solely by the series of pockets.

FIG. 17 illustrates a device which embodies features of the present invention in a form showing that it is not necessary that the control slide be in a form to have only straight line reciprocative motion. The device 520 there shown consists of opposed base and top plates 621 and 624 having their juxtaposed faces recessed to define therebetween a circular chamber 625 in which is pivotally mounted a rotary control slide 626. The rotary control slide is pivotally supported at 98 for rotary swing back and forth by means of its handle 229, which is to be swung back and forth arcuately (as is indicated by the double-ended arrow) in the slot 99 extending to the circular chamber 625. The top plate 624 is provided with a circular track 1044 having a series of succeeding stepped abutments 539 radially arranged therein. Animated piece 455, which may be in the form of a permanent magnet having a circular outline, will be caused to move step-by-step about the circular track successively over the radial abutments 539 by rotary reciprocation therebeneath of radially-extending, paramagnetic elements 433 carried by the rotary control slide 626.

FIG. 18 illustrates that while the path of motion of an animated piece may extend generally transverse of the path motion of the series of magnetic elements carried by the control slide, if portions thereof extend obliquely toward the latter as may result from the transverse zig-zag path shown at 1144, a piece may be caused to zig-zag, step-by-step, across the path of reciprocative motion of the control slide. Thus, in such a case, forward slide of the series of magnetic elements 33 therebelow will cause an animated piece, such as circular magnet 455, to move forward from position 100 to position 101 beyond and to the right of projecting corner 102, then to roll forward along oblique wall 103 to position 104 in recessed corner 105. Upon withdrawal or reverse slide of the series of magnetic elements the piece 455 will be drawn back to position 106 laterally to the right of projecting corner 107 then to be rolled back along oblique wall 108 with reverse rotation to position 109 corresponding to position 100. As a result the piece 455 moves step-by-step in zig-zag fashion transversely across the field area with the successive projecting corners serving as checking abutment means to permit further advance by reciprocative control slide action.

FIG. 19 illustrates at 630 a still further embodiment of an animated device incorporating features of the present invention in which, for example, the field area top plate 724 may be provided with a fan-shaped, depressed track area 1244, the starting end of which is wide with its side walls 241 and 242 converging toward each other for close approach at a throat locality 110 leading to a relatively narrow finish zone or section 111. Such depressed area 1244 is provided with a series of stepped notches 112, similar to those previously described, for step-by-step advance of play pieces 446 thereacross in a forward direction when slide 726 (which may be similar to slide 26) is reciprocated. Such structure may be useful, for example, in a game simulating a "drag race" of automobiles with the play pieces eventually being crowded in their forward motion into the narrow throat 110 and the narrow confines of the finish line zone 111 therebeyond.

The embodiment of the device illustrated at 820 in FIG. 20 is generally of the type wherein the motion path of the movable piece is defined by a succeeding series of consecutive notches which delineate the successive steps of advance motion of the movable piece. The board unit or hollow casing thereof includes an elongated base plate 821, a top field area plate 824 spaced vertically by side wall strips 822 and 823, to define therebetween elongated slot or chamber 825 in which is reciprocatively mounted elongated control slide 826. The path of motion 834 is defined on the upper surface of top field area plate 824 by a succeeding series of consecutive notches 838, all of substantially the same length and these predetermine the lengths of steps of advance motion along this path. The control slide 826 carries the longitudinally-spaced series of magnetic areas in the form of elongated and relatively narrow strips 833 of metallic material having magnetic permeability, such as sheet iron, spaced a distance apart at least equal to the lengths of the steps of advance motion.

The control slide 826 of the FIG. 20 embodiment preferably is provided with means to limits its reciprocative motion while permitting it to be thrust forward and pulled back through a path at least as long as the length of each step of advance motion predetermined by the length of each notch 838. For this purpose, side strip 822 of the board casing may have an elongated slot 113 in the side thereof in which rides a pin 114 fixed on the side of the control slide 826. The near end of the control slide 826 carries a manually operable grasp handle 829 for thrusting the slide forward and pulling it back in the elongated slot 825.

The movable piece 845 which is to be advanced step-by-step along the track 834 of the device 820 shown in FIG. 20 defined by the series of notches 838 may be in a variety of forms, such as those previously illustrated, and has a base portion 846 which at least includes a transversely extending, elongated permanent magnet. The movable piece 845 may be simply a rectangular block of wood having a transverse notch in its underside in which magnet 846 is cemented as is illustrated in FIG. 20. This animated or movable piece 845 is to be moved through one step of advance motion from one of the notches 838 to the next succeeding notch on each forward thrust of the control slide 826 in the manner previously indicated, with the slide then being retracted to its initial position for the next thrust forward to advance the piece through the next step of advance motion.

While the preceding embodiments have proposed that the path of motion of the animated or movable piece be defined by a series of upstanding members, preferably in the form of a succeeding series of consecutive notches, it is to be understood that this is not necessary to operable embodiments of the present invention, as will be understood from the following descriptions of FIGS. 21 to 29 inclusive. In FIGS. 21 to 29 inclusive are illustrated such embodiments which include means providing the top surface of the lateral field area as a relatively smooth face on which is defined a planar path of forward motion of a movable piece and composed of a succeeding series of consecutive steps of advance motion of certain predetermined lengths along the path. For use with this lateral field area is provided a movable piece having a slidable base resting upon the relatively smooth planar top surface and frictionally engaging the latter temporarily to remain in a rest position at the end of each step of slidable advanced motion until urged forward, with the movable piece having certain mass and attendant inertia requiring application of positive moving force thereto to overcome the inertia and opposing frictional drag for step-by-step sliding advance of the piece along the path from the intervening rest positions. Magnetic means are carried by the base of the movable piece relatively close to the top surface of the lateral field area. A reciprocative lateral control slide is located immediately beneath this top surface and it carries fixed thereon a plurality of successively-arranged, separated and localized magnetic areas each having a localized attraction affinity for the magnetic means carried by the slidable base with these magnetic areas located beneath and spaced in the general direction of the path of advance motion at distances which are at least equal to each of the lengths of the consecutive steps. With the means which provides the lateral field area there is associated guide means for the control slide to guide the reciprocative motion of the latter with the localized magnetic areas thereon located beneath the motion path and movable alternately back and forth thereby along the latter. The control slide has associated therewith means reciprocatively to drive it back and forth including repetitive forward drive thereof through a distance at least equal to the lengths of the consecutive steps to cause the localized magnetic area of the slide which is nearest the at-rest piece base closely to approach and exert sufficient magnetic attraction upon the base magnetic means with application of positive moving force to overcome the inertia of the movable piece and the opposing frictional drag between its base and the lateral field area top surface and then to slide the piece therewith forward over the top surface through a step of advance motion. There is also provided in these embodiments of the device means to disengage the base magnetic means from the magnetic attraction of the localized magnetic area which advanced the base through the step advance motion and permit the driving means to return the slide along its path of forward drive to its initial position while leaving the piece base at rest in its advanced step position with a localized magnetic area on the control slide ahead of the one which slid the piece base to the advance step position being moved back to the vicinity of the at-rest base for succeeding repetition of the step advance.

The embodiment of this device which is illustrated in FIG. 21 is much like that illustrated in FIG. 20, for purposes of ready comparison, except for the distinction of the means which is provided for preventing back motion of the movable piece upon retraction of the slide and the driving means for the latter. The board unit 920 of the FIG. 21 embodiment includes a base plate 921, a top field area plate 924 and intervening side wall strips 922 and 923, defining together an elongated control slide-receptive slot or chamber 925. The top surface 1924 of the top plate 924 is planar and relatively smooth, free of any pockets or notches, and has defined thereon an elongated track area 934 merely by printing or the like. The printed track area 934 may be subdivided by printing into relatively short sections or zones 938 which may each represent one of the successive advance steps of motion of the movable piece, or a plurality thereof, but need not be so subdivided by printing. For example, each transverse zone 938 may be of a dimension in the longitudinal direction of the path or track area 934 double the predetermined length of each successive step, which is the distance between one of the transverse printed lines defining an edge of one of the zones or sections 938 of the track or path 934 and a next adjacent intermediate dot-dash line 115, not printed on face 1924, and it is to be understood that each advance step distance may be positively defined by adding additional transverse printed lines at the locations of the dot-dash lines 115, or that all transverse lines of printing may be omitted.

In the FIG. 21 device the control slide 926 may be similar to that shown at 826 in the FIG. 20 embodiment, in the form of an elongated flat plate carrying on its front end a manually operable grasp handle 929 projecting from the front end of the board unit. Side wall strip 922 is provided with an elongated slot 213, similar to the slot 113 in FIG. 20, and an elongated pin 214 riding freely therein is fixed to and carried by a side edge of the control slide 926. A helical tension spring 387 has one end fixed to the outer end of pin 214 and its other end fixed to the board unit, such as the base plate 921, constantly biasing this pin toward the back end of the slot 213. Thus, as will be more fully explained in connection with the operation of the embodiment of FIG. 21, the driving means for the control slide 926 includes the manual grasp handle 929 for forward thrust and the biasing spring 387 for quick return motion upon release of the handle.

As in FIG. 20 the reciprocative control slide 926 carries on its top face a plurality of longitudinally-spaced, transversely-extending magnetic elements 933, which may be in the form of relatively narrow and elongated strips of sheet iron. These longitudinally-spaced magnetic elements 933 are arranged along the entire top surface of the slide which is immediately beneath the printed track or path of piece motion 934 and the distance between center lines of the successive pairs thereof is substantially equal to the predetermined step distance and to the distance of reciprocation of the control slide as is determined by the slot 213 and the pin 214 riding therein.

A variety of types of movable pieces may be employed with the board unit of FIG. 21, such as that illustrated at 945, which may have a superstructure in the form of a figurine supported upon a base section 946, including a transversely extending magnetic element 1046, which may be in the form of a permanent magnet having a flat bottom surface 1049 and its opposite end poles located in opposite sides of the base section. The base section 946 of the movable piece 945 carries brake means which will be automatically manipulated to braking position when the control slide 926 is returned from an advanced position toward its initial position and with the brake means being automatically released when the control slide is advanced by drive through a step of advance. Such brake means may be in the form of a pad 116 of friction material, such as sponge rubber, cemented to the underside of the superstructure of the base section 946 and having a flat bottom surface 1116 which may be brought to face engagement of the top surface 1924 of the top plate 924 for secure frictional engagement. As will be seen from FIG. 21, the base section 946 has a shaped bottom face permitting it to be rocked back and forth about a contact zone provided by the transverse magnet 1046 and the center of mass of the movable piece 945 preferably is located forward of the brake means provided by the rubber pad 116 so as to assure forward tilt of the base section and slide thereof in a forwardly rocked position with the front edge 1048 of the magnet contacting the field area top surface as the line of fulcruming. Thus, in the forwardly rocked position of the movable piece 945, as shown in full line in FIG. 21, its base section 946 may rest upon the board unit top surface 1924 with two transverse lines of contact, one at the front edge 1048 of the magnet and the other at the front bottom edge 1148 of the base superstructure. By restricting contact between the bottom surface of the base section 946 and the field area top surface 1924 to two such lines of contact, frictional drag is reduced to a minimum to facilitate slide of the piece 945 forward.

In operation of the device depicted in FIG. 21, let it be assumed that the movable piece 945 is in the full line position there depicted and that it is desired to advance it one step forward along the defined path of motion or track 934. With one of the magnetic elements 933 carried by slide 926 located immediately beneath the magnet 1046 relative slow forward thrust of the control slide by the manual grasp handle 929 will cause the movable piece to slide forward therewith due to the attraction affinity between the magnet and the nearest of the magnetic elements 933 carried therebeneath by the control slide, with the lines of magnetic force passing therethrough transversely. During this advance step action, the brake pad 116 is held in an upwardly tilted position with its bottom face 1116 free from contact with the lateral field area top surface 1924.

As soon as the drive or thrust limiting pin 214 of the FIG. 21 apparatus reaches the front end of the elongated slot 213, which determines the length of the forward motion of the control slide 926, the operator may then release the hand grasp or handle 929, permitting the biasing spring 387, which has been stretched by this forward thrust of the control slide, quickly to return or snap the latter back to its initial position. In the first increment of this rapid return motion the transverse magnetic element 933, which caused the advance of the movable piece 945 through a step of advance motion, will be moved at relatively high speed back from under the base magnet 1046. As this occurs the force of attraction between the magnet 1046 and the retracting magnetic element 933 rocks the base section 946 of the movable piece backward to bring the bottom face 1049 of the magnet 1046 and the bottom face 1116 of the brake pad 116 into secure contact with the lateral field area top surface 1924, thereby automatically manipulating this brake device to such braking position to increase the frictional drag against the board unit top surface and assure sufficient frictional drag to prevent the inertia of the play piece from being overcome and sliding back with retraction of the control slide. Such a braking position of the play piece is indicated in dotted lines at 1945 in FIG. 21, but in a much more advanced position for clarity. During further rapid retraction of the control slide 926 as its magnetic element 933 which advanced the movable piece 945 leaves the immediate vicinity of the base magnet 1046, the attraction affinity therebetween is sufficiently reduced to permit the movable piece to again rock forward on its base section 946 to the full line position shown in FIG. 21, but at a time when the reduced attraction affinity is less than frictional drag in such position, so that the movable piece will remain in its step advanced rest position. Thus the rapid retraction of the control slide 926 automatically releases the brake provided by the rubber pad 116, so that the action may be repeated upon the next drive or thrust forward of the control slide 926 with the use of the transverse magnetic element 933 which is immediately ahead of the one that moved the piece through this step of advance and which has now been moved back to the immediate vicinity of the movable piece magnet 1046 for repetition of the action.

A variation of the movable piece illustrated at 945 in FIG. 21 is shown at 1045 in FIG. 22. The movable piece 1045 shown therein, with a top portion thereof being broken away, is provided with a base section 1146 which carries transverse magnet 1246 having a flat bottom face 1249. The bottom surface 1349 of the base section 1146 may be curved, as shown, with sections thereof ahead and behind the transverse magnet 1246 being merged with the bottom surface 1249 of the magnet so that together they provide a rocker bottom surface. The rear section of this rocker bottom surface 1349 behind the transverse magnet 1246 may be provided with friction increasing means, such as a roughened surface which may be provided by a pad 1216 of sandpaper or other rough material. Preferably the center of mass of the play piece 1045 is located forward of the brake means provided by the roughened pad 1216 so that the center of gravity may be located along a forward line, such as that indicated by the dot-dash line (X), when the bottom rocker surface 1349 is at rest upon the field area top surface of the base unit, thereby tilting the braking surface of the roughened pad upwardly free from contact with this top field area surface.

In the use of the animated piece 1045 of FIG. 22 the rocker bottom surface 1349 may have practically line contact with the field area top surface so that frictional drag is minimized to permit ready advance motion on forward thrust of the control slide. Upon retraction of the control slide and during the first increment thereof the animated piece 1045 is rocked backward to bring the roughened brake surface or pad 1216 to contact with the field area top surface, thereby developing an increase in frictional drag sufficient to maintain the animated piece in a rest position until the attraction affinity between its magnet and the retracting transverse magnetic element of the control slide which advanced it is reduced by separation sufficiently to permit the piece again to rock forward and remain at rest due to the lesser frictional drag provided in the forwardly rocked position.

In FIGS. 23 and 24 are illustrated further variations of such animated figures which are provided with rocking base sections. The animated piece 1445 which is depicted in FIGS. 23 and 24, with a portion of the superstructure thereof broken away, has a base section which includes a base plate 1446 to the bottom side of which is affixed a permanent magnet 1546 having a bottom face 1549 resting upon top surface 1924 of the field area top plate 924. The back end of base plate 1446 carries a brake strip 1316, which may be in the form of a flexible strip of rubber fixed at 1416 to the base plate and extending obliquely rearward and downwardly to line contact of its bottom end edge 1516 with the top surface 1924. The magnet bottom face 1549, which has a flat area of contact with the field area top surface 1924, and the line of contact therewith of the braking strip 1316 at 1516, provide limited frictional drag which is readily overcome by the magnetic force of attraction or the affinity of the magnet 1546 for the magnetic element 933 moving forward beneath the field area top plate 924. Thus, as the nearest of the transverse magnetic elements 933 is moved forward on forward thrust of the control slide, it causes the movable piece 1445 to move forward through one step of advance. At the end of the forward thrust of the control slide of FIG. 21 the movable piece 1445 comes to a position of rest similar to that illustrated in full lines in FIG. 23.

When the control slide of the apparatus of FIG. 21 is then rapidly retracted, during the first increment of this return motion the transverse magnetic element 933 of the control slide tends to move rapidly backward from beneath the movable piece 1445 causing the base section of the piece to rock backwardly, as is illustrated in FIG. 24, about a rear edge of the magnet 1546. As a result, the free back section of flexible rubber brake strip 1316 is flattened down so that a relatively large area of its bottom face 1616 is snugged against the field area top surface 1924 to provide sufficient additional frictional drag as to prevent the movable piece 1445 from sliding back with the retracting magnetic element 933. As the distance between the movable piece magnet 1546 and the retracting magnetic element 933 increases, the field of magnetic force which tied them together is progressively decreased or weakened until there no longer is sufficient to retain the movable piece in its backwardly rocked position. The resiliency of the braking strip 1316 thus causes it to recover to its original shape and raise the movable piece 1445 to its erect position of FIG. 23 from the backwardly rocked position of FIG. 24, leaving it in its rest position at the point of step advance.

On the next thrust forward of the control slide, the action of the movable piece 1445 is repeated with the use of the transverse magnetic element 933 thereof which was immediately ahead of the one that effected this first step of advance. Thus the movable piece 1445 may be moved forward step-by-step with successive reciprocations of the control slide.

In FIGS. 25 and 26 is illustrated a further embodiment of the movable piece which may be advanced step-by-step along a relatively smooth and unbroken planar top surface, such as that illustrated at 1924 in FIG. 21. The movable piece 1745 may be in the form of a substantially rectangular body having a flat bottom surface 1749 slidably rested upon top surface 1924 of the field area top plate 924, and formed of any suitable material, such as plastic. The body of movable piece 1745 is provided with an internal chamber 117 extending from close to the movable piece front end wall to the vicinity of the back end wall thereof, and having an upwardly and rearwardly extending or inclined bottom wall 118. The magnetic body which is incorporated in the movable piece 1745 preferably is in the form of an elongated cylindrical element, as is best seen in FIG. 26, which may be in the form of a permanent magnet having a north end pole 1846 and a south end pole 1946. However, if the magnetic elements on the control slide to be reciprocated beneath the top plate 924 are in the form of separate transversely-extending magnets, the magnetic body 1746 may be a cylinder of iron or other magnetically permeable material.

With respect to the embodiment of FIGS. 25 and 26 let it be assumed that the control slide 926 of FIG. 21 is reciprocatively mounted below top plate 924, carrying thereon longitudinally-spaced successive magnetic elements 1033 and 1133 similar to those indicated at 933 in FIG. 21, and shown in full lines in FIG. 25. The cylindrical magnetic element 1746 will, by force of gravity tend to be located in the front end of chamber 117 where it is most closely positioned to the reciprocating path of the slide control magnetic elements 1033 and 1133. With the rear one of these slide magnetic elements 1033 located immediately beneath the magnetic body 1746 while the movable piece 1745 is in a rest position, indicated in full lines on the left side of FIG. 25, thrust forward of the control slide will cause this magnetic element to move forward to take the position of the preceding slide magnetic element indicated at 1133. In doing so, the movable piece 1745 will be slid forward or advanced a distance (A), i.e., one step, to the dotted line position 2745 indicated therein. Then, upon retraction of the control slide to retract the magnetic element 1033 from the position indicated at 1133 to its initial position, the magnetic body 1746 will, during the first increment of this retraction be rolled back up the incline 118 and, in doing so, gradually increase the spacing between it and this slide magnetic element. The movable piece 1745 will remain in this rest position due to the frictional drag between its bottom surface 1749 and the field area top surface 1924 while the cylindrical magnetic body 1746 is rolling up the incline. Let it be assumed that this occurs through the increment of retraction indicated at B in FIG. 25 and effects rolling travel of the magnetic body 1746 almost fully up the incline 118 to the dotted line position 2046. The gradually increased spacing between the magnetic body 1746 and the magnetic element 1033, will be such that in their respective dotted line positions 2046 and 1233 in FIG. 25 the force of magnetic affinity or attraction has been so weakened that with further retraction of the magnetic element there will be less force applied to the movable piece 1745 than that sufficient to overcome the frictional drag of its bottom surface 1749 against the field area top surface 1924. The magnetic element 1033 will then be moved backward from the dotted line position 1233 to its initial position shown in full lines at 1033 through the distance C, in FIG. 25, while leaving the movable piece in its rest position 2745, thereby freeing the cylindrical magnetic body 1746 so that it may roll down again to the front end of chamber 117 to the vicinity of the preceding transverse slide magnetic element at 1133 which is immediately ahead of the one that advanced the movable piece through the step of advance A, to be employed in the next forward thrust of the control slide for the next step of advance.

In FIGS. 27, 28 and 29 is illustrated an embodiment of the invention of which an operative prototype has been constructed in preparation for marketing. In this form, the board unit 2120 is similar in several respects to that proposed at 520 in FIG. 17, being provided with a rotary control slide 2126 and a circular track or path of motion 2134. The movable piece 2145, best seen in FIG. 27, which may be employed with the board unit illustrated in FIGS. 28 and 29, may be in the general form of a rectangular wooden block provided with minor shaping and a superstructure to resemble an automobile. The flat bottom face of the movable piece 2145 is subdivided into a pair of rectangular forward and rearward slide face sections, respectively identified by numerals 2249 and 2349, by a transverse notch in which is affixed, such as by cementing, an elongated transversely-arranged magnet 2146 having a flat bottom surface 2149 in the plane of these sections of the bottom face of the block body. The sections 2249 and 2349 of the bottom face of the block body may be coated with a paint product, such as conventional enamel.

The board unit 2120 may include a bottom plate 2121, a top plate 2124 and an intervening plate structure 2122, all made from cardboard or compacted paperboard, with opposed faces suitably cemented together. The intervening ply or layer 2122 has the central area thereof cut out to provide a circular chamber 2125 to which access is made at quarter points by notches 2199. The control slide may be in the form of a circular disc of similar cardboard or paperboard loosely mounted in the chamber 2125 for rotation therein. As is indicated in FIG. 29, the control slide 2126 may be provided with a plurality of generally radially-extending magnetic elements 2133 by cutting out from a readily bent sheet of magnetic permeable material, such as sheet iron, a rake-like unit 119 having a strip base 219 from which extend in longitudinally-spaced relation the elongated magnetic elements as fingers 2133. Four such rake-like elements 119 may be provided for mounting on the control slide disc approximately through quarter sections thereof, such as by applying a cement to the sections of the circular edge 319 for fastening thereto the base strip of this rake-like structure. Then the fingers or magnetic elements 2133 may be bent over and cemented to the top surface of the disc. In order that all of the magnetic elements, including fingers 2133, will be arranged in uniformly-spaced relation along the periphery of the control slide disc 2126, additional localized magnetic elements or rectangular strips may be cemented in intervening positions at the quarter points, indicated at 3133. The control slide disc 2126 also may carry at the quarter points a plurality, such as four, manual handles 2129 mounted for lateral rotary reciprocation in the notches 2199, and with the latter wide enough to permit forward rotation of the marginal circular zone of the control slide disc which carries magnetic elements 2133 and 3133 through the distance of a step of advance of the movable piece 2145. One or more resilient or elastic elements 2187 may be provided to connect one or more of the manual handles 2129 to the fixed structure of the board unit, such as the middle ply 2122, with each to be stretched for biasing the rotary disc back toward its initial position as it is rotated forward by one or more of the manual handles 2129 permitted by the notches 2199, for snap or quick return. One end of each rubber band 2187 is anchored in a shallow recess 3129 in one of the handles 2129, and its other end may be anchored in a similar recess in ply 2122. Thus the driving means for the rotary control slide disc 2126 includes one or more of the manual handles 2129 and one or more of the quick return resilient elements or rubber bands 2187.

The circular track or path of motion 2134 of the movable piece 2145 and radial lines which may subdivide it into successive sectors 2138 may be printed upon the top surface of the top ply 2124 which constitutes the field area of the board unit. The successive sectors 2138 of path 2134 may each be of a circumferential length substantially equal to the predetermined length of each step of advance of the movable piece 2145.

In operation of the embodiment illustrated in FIGS. 27 to 29 inclusive let it be assumed that one or more movable pieces 2145 are placed in rest positions upon the printed track 2134, such as at the full line positions indicated in FIG. 28. One may manually grasp one of the handles 2129 and thrust it forward to rotate the control slide disc 2126 through one step of advance motion. As this is done the nearest elongated magnetic means in the form of one of the magnetic elements 2133 and 3133, carried by the control slide disc 2126, will be rotated relatively slowly through this same radial angle to travel longitudinally beneath the printed track 2134 the predetermined distance of one step of advance with magnetic lines of force extending from opposite ends of transverse magnet 2146 passing longitudinally therethrough and tying these magnetic bodies together. This magnetic force is sufficient to overcome the inertia of the movable piece 2145 and the frictional drag of its bottom surface composed of the bottom face areas 2249 and 2349 and the bottom face 2149 of the magnet 2146. When each movable piece 2145 has been advanced in this fashion through a step of advance to the extent permitted by the width of the notches 2199 in which the manual handles 2129 can be slid forward, the movable pieces come to rest with the stopping of the rotary control slide.

Then, upon release of the manual handle 2129 which rotated the control slide disc 2126 the one or more biasing rubber bands 2187 will snap the disc back to its initial position. During the rapid retraction of the control slide disc 2126, the movable pieces 2145 will remain in their advanced rest positions because of the speed with which the advancing magnetic elements 2133 or 3133 are retracted away from the movable pieces 2145. The frictional drag between the bottom surfaces of the movable pieces 2145 and the top surface 3124 of the field area ply or plate 2124, and the inertia of the movable pieces, causes them to remain in their stop positions while the magnetic elements 2133 and 3133 on the control slide disc 2126 are being rapidly retracted therefrom. Relatively slow forward manual motion of the control slide disc 2126 permits the movable pieces to be picked up and tied to the nearest slide magnetic elements carried forward by the control slide disc 2126, while the rapid snap return of the latter prevents them from being moved backward therewith. Consequently, the means which provides for the rapid return of the control slide disc 2126, in the form of the biasing resilient elements or rubber bands 2187, constitutes means to disengage the base magnet 2146 of each movable piece 2145 from the magnetic force or attraction of the localized magnetic area or element, 2133 or 3133, which advanced it through the step of advance motion. This biasing means also serves as the part of the driving means which returns the control slide disc 2126 back along its path of forward drive to its initial position, while leaving each movable piece 2145 in its advanced step rest or stop position, there to be picked up by the control slide magnetic element immediately there ahead as it is retracted to the near vicinity of the magnet 2146 carried by the movable piece for repetition of the step advance.

By way of example, the embodiment of the apparatus of the present invention which is illustrated in FIGS. 27 to 29 inclusive was constructed in an operative form with the following dimensions, from the following materials and with the following values. The top plate 2124 was made of a conventional pulp composition board about $\frac{1}{16}$″ thick having a thin surface sheet of fine particle paper constituting the top surface 3124. The surface sheet of paper was relatively smooth, but had a slightly course surface, and much smoother surfaces have been found to be operative. The movable piece 2145 was about 1⅛″ long and about ¾″ wide, in the form of a block of wood, and the magnet 2146 set in the transverse groove formed in its bottom face was about $\frac{3}{16}$″ thick, about ⅛″ wide and about ⅝″ long. The weight of the movable piece assembly was about ½ of an ounce. The front area 2249 of the bottom face of the movable piece, in front of the magnet 2146, was about ¾″ wide and ⅛″ long while the rear area 2349 of the bottom face, behind the magnet, was about ¾″ wide and about ¾″ long. These two bottom face areas 2249 and 2349 were coated with a conventional coating enamel and the flat face 2149 of the magnet 2146 was arranged in the same plane so that all three simultaneously contacted the field area top surface 3124. The magnet 2146, when spaced by the pulp composition board of the top ply 2124 at about $\frac{1}{16}$″ from a magnetically permeable body, had a strength sufficient to lift the latter when it is of a maximum weight of about one ounce. The strips 2133 and 3133 of magnetically permeable material, or sheet iron, on the top surface of the control slide disc 2126 were approximately of the same transverse length and longitudinal widths as the bottom face 2149 of the movable piece magnet 2146, i.e., about ⅝″ by ⅛″, and in some cases of much greater transverse length since this excessive length is immaterial. In the working model this sheet iron was 0.0064″ in thickness but appreciably thinner sheet is suitable, such as 0.0004″. The space between each of the magnetic elements 2133 and 3133 was about 1⅛″, which is approximately equal to the lengths of the advance steps permitted by the widths of the notches 2199. The relatively high speed of the retraction of the released control slide disc 2126 by the biasing of the stretched rubber bands 2187, when only one of these is used as was found to be suitable, is sufficient to return the control slide disc through this 1⅛" travel back to its initial position in about one-quarter of a second.

There is no implication of limitation intended by the above values since wide variations have been found to be possible in operative models. For example, the movable piece may be considerably larger and heavier or much smaller, and even the magnet itself may serve as the entire movable piece and operate successfully. Wide variations in dimensions and materials of the parts of the board unit have also been found to be possible in practical operative embodiments, and while a slightly rough surface 3124 of the field area is acceptable, very hard smooth surfaces have been found to be operative. Simple and easy experimentation will readily inform one of the proper relationships of such values and conditions within the wide ranges permissible.

While the magnetic elements 2133 and 3133 extend generally radial of the control slide disc 2126 they need not be mounted thereon in true radial orientation. For example, a few consecutive ones of these magnetic elements may be canted slightly forward or rearward, as may be desired, while extending in general radial directions, so as to give certain localized diverting motion to the movable pieces 2145 as they are circularly advanced step-by-step along the circular path 2134, of the FIGS. 27 to 29 inclusive embodiment. Certain game rules may dictate such localized diversion to either one side or the other of this circular track and it may be obtained by such slightly angular localized placement of a few of the consecutive driving magnetic elements on the control slide disc.

It is to be understood that embodiments of the present invention are not limited to devices designed for manual manipulation of a control slide since, obviously, the reciprocating action thereof may be attained through the operation of mechanical means, such as an electric motor power source and driving linkage including cam or crank arm means. It is also to be understood that the present invention may be used to advantage in animated advertising displays or attention getting devices designed to stimulate trade by causing passers-by to stop and look, then enter establishments.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. An animated device comprising, in combination, means providing a lateral field area having a top surface on which is defined a path of forward motion of a movable piece, a movable piece having a base resting upon and slidable over the top surface along the path, magnetic means carried by said base relatively close to said top surface, cooperative piece motion restricting means on said top surface and said base permitting step-by-step forward motion of the latter over the former through predetermined successive step distances along the path while preventing appreciable reverse motion between periods of forward step-by-step motion, a reciprocative lateral control slide located beneath said top surface carrying fixed thereon a plurality of successively-arranged separated and localized magnetic areas each having a localized attraction affinity for the magnetic means carried by said movable piece base with said magnetic areas located beneath and spaced in the general direction of the movable piece motion path at distances which are at least equal to each of the predetermined successive step distances, means to guide said control slide in reciprocative motion with said localized magnetic areas thereon being alternately moved back and forth along the movable piece motion path, and means to reciprocate said slide back and forth by alternate forward thrust and return through a distance at least equal to each of the predetermined successive step distances with said cooperative piece motion restricting means allowing forward advance of said base freely over said top surface through the distance of one of the successive steps upon each forward thrust of said control slide while preventing backward motion of said base through this step distance upon reciprocative return of said control slide for maintenance of said base in its advanced position there to be picked up for a successive step of advance by a succeeding one of said magnetic areas on the next thrust forward of said slide.

2. The animated device as defined in claim 1 characterized by said magnetic means carried by said slide being elongated rod-like elements of paramagnetic material.

3. The animated device as defined in claim 1 characterized by said localized magnetic areas being relatively narrow and elongated elements arranged substantially parallel to each other and extending in the direction of their lengths obliquely transverse of the slide motion path.

4. The animated device as defined in claim 1 characterized by said path of forward motion of said piece defined on said top surface being arcuately arranged thereon, said slide guide means being means guiding said control slide for arcuate rotary reciprocation with an arcuate zone thereof rotating beneath said arcuate path, said plurality of localized magnetic areas carried by said rotary slide being relatively narrow and elongated and arranged in the direction of their lengths generally radial of the center of rotation of said slide while extending transversely across said zone.

5. The animated device as defined in claim 1 characterized by the provision of additional transversely-extending guides with said control slide movably mounted on the latter for motion transverse of the defined movable piece motion path in addition to the reciprocation thereof along said path.

6. The animated device as defined in claim 1 characterized by said control slide comprising a corrugated sheet of paramagnetic metal with the top crowns of the ribs thereof constituting said transversely-extending and longitudinally spaced magnetic means.

7. The animated device as defined in claim 1 characterized by resilient means biasing said control slide toward one limit of its reciprocative motion and means mechanically to move said slide to the other limit of its reciprocative motion in opposition to the biasing force.

8. An animated device comprising, in combination, means providing a lateral field area having a top surface on which is defined a path of forward motion of a movable piece composed of a succeeding series of consecutive steps of advance motion of certain predetermined lengths along said path, a movable piece having a slidable base resting upon said top surface and frictionally engaging the latter to remain temporarily in a rest position at the end of each step of slidable advanced motion until again urged forward, said piece having certain mass and attendant inertia requiring application of a positive moving force thereto to overcome the inertia and opposing frictional drag for step-by-step sliding advance of said piece along the path from the intervening rest positions, magnetic means carried by said base relatively close to said top surface, a reciprocative lateral control slide located immediately beneath said top surface carrying fixed thereon a plurality of successively-arranged separated and localized magnetic areas each having a localized attraction affinity for the magnetic means carried by said slidable base with said magnetic areas located beneath and spaced in the general direction of the path of advance motion at distances which are at least equal to each of the lengths of the consecutive steps, means to guide said control slide in reciprocative motion with said localized magnetic areas thereon located beneath the motion path and movable alternately back and forth thereby along the latter, means reciprocatively to drive said control slide back and forth including repetitive forward drive through a distance at least equal to the lengths of the consecutive steps to cause the localized magnetic area of said slide nearest said at-rest piece base closely to approach and exert sufficient magnetic attraction upon said base magnetic means with application of positive moving force to overcome the inertia of said piece and the opposing frictional drag between its base and said top surface and to slide said base therewith forward over said top surface through a step of advance motion, and means to disengage said base magnetic means from the magnetic attraction of said localized magnetic area which advanced said base through the step of advance motion and permit said driving means to return said slide along its path of forward drive to its initial position while leaving said base at rest in its advanced step position with a localized magnetic area on said slide ahead of the one which slid said base to the advanced step position being moved back to the vicinity of said at-rest base for succeeding repetition of the step advance.

9. The animated device as defined in claim 8 characterized by said driving means being of a structure for forward motion drive of said control slide at a relatively slow speed periodically to effect relatively slow forward slide of said base through one step of advance and then release of said control slide at the end of each advance step, said disengaging means being incorporated in said driving means as a quick return resilient means connected to said control slide and biasing it back toward its initial position for relatively rapid reverse motion to the latter upon release of said control slide.

10. The animated device as defined in claim 9 characterized by said driving means including a manual engaging member mounted on said control slide, said guide means limiting the forward motion of said control slide to the length of one step advance, and said quick return resilient means being connected between said guide means and said control slide.

11. The animated device as defined in claim 8 characterized by said means to disengage said base magnetic means from the magnetic attraction of said localized magnetic area on said control slide which advanced said base through the step of advance motion including brake means on said base which is automatically manipulated to braking position to increase the frictional drag against said top surface when said control slide is reversed from advance drive to return motion, said brake means being automatically released when said control slide and its localized magnetic area which advanced said base through the step are retracted a distance back from the rest position of said base sufficient to reduce the attraction affinity to less than the frictional drag.

12. The animated device as defined in claim 11 characterized by said base having a bottom face shaped to rock longitudinally on said top surface with the rear portion thereof carrying said brake means as friction increasing means, the center of mass of said piece being located forward of said brake means to assure forward slide of said base in a forwardly rocked position with said brake means freed from contact with said top surface during step advance thereof by forward drive of said control slide, said base being rockable back rearwardly to contact of said top surface as said control slide is reversed and retracted.

13. An animated device comprising, in combination, a game board having a base structure and a superposed lateral field area sheet provided with a top surface on which is defined a path of forward motion of a movable play piece composed of a succeeding series of consecutive steps of advance motion of certain predetermined lengths along said path, a movable play piece having a slidable base provided with a bottom surface resting upon said top surface and frictionally engaging the latter to remain temporarily in a rest position at the end of each step of slidable advance motion until again urged forward, elongated magnetic means carried by and extending tranversely of said play piece base adjacent its bottom surface close to said game board top surface, a reciprocative lateral control slide movably mounted in said game board base structure immediately beneath said field area sheet, a plurality of succesively-arranged relatively narrow and elongated magnetic elements carried by said control slide immediately beneath and extending transversely of said path with each of said magnetic elements having a localized transverse attraction affinity for said magnetic means carried by said slidable play piece base with the magnetic lines of force extending longitudinally therethrough transversely of said path, said transverse magnetic elements being spaced apart in the general direction of said path at distances substantially equal to the lengths of the consecutive steps, guide means in said base structure movably supporting said control slide for the reciprocative motion and limiting its forward and return movement to a distance substantially equal to the lengths of the consecutive steps, a manual operator mounted on said slide control and projecting from said game board for hand engagement to drive said control slide forward slowly from an initial stop position to permit one of its magnetic areas closest to said play piece base to apply driving force to the latter and advance it one step along said path, and quick return resilient driving means connected between said base structure and said control slide biasing the latter toward its initial stop position as said control slide is manually driven forward to return the latter rapidly when said manual operator is released for disengagement of said play piece magnetic means from the attractive force tying it to the magnetic area which advanced it to leave said play piece at rest in an advanced step position and in such control slide return to retract the magnetic area thereahead back to beneath said play piece magnetic means in the advanced step rest position to pick up said play piece base and advance it the next step forward in like manner upon the next reciprocative drive forward of said control slide.

14. An animated device comprising, in combination, means providing a lateral field area having a top surface, means defining a path of motion of a movable piece over said top surface including at least three succeeding upstanding means spaced a predetermined first distance apart with each adapted individually to restrict lateral motion of said movable piece across the field area to predetermined action, a movable piece to rest upon said field area top surface, magnetic means carried by said movable piece, a movable lateral control slide mounted beneath said field area, means to guide said control slide in reciprocative motion along a path extending in the general direction of at least a portion of the intended path of motion of said movable piece which includes at least two successive units of said upstanding means, means to reciprocate said control slide along its path through a second predetermined distance at least equal to the distance between transverse planes at the locations of the two successive units of said upstanding means which are generally normal to the path of reciprocative motion of said slide and appreciably less than the length of the movable piece motion path, and magnetic means carried by said slide having an attraction affinity for the magnetic means carried by said movable piece, said slide magnetic means being in the form of laterally separated areas fixedly spaced relative to each other on said slide in the general direction of the path of motion of said movable piece, at least two of said laterally separated magnetic areas being so spaced about the first mentioned distance apart.

15. An animated device comprising, in combination, means providing a lateral field area having a top surface, means defining a path of motion of a slidable piece over said top surface in a predetermined general direction, a slidable piece to rest upon said field area top surface, a body of magnetic material carried by the bottom portion of said slidable piece, a plurality of upstanding means defined in said top surface extending across the general direction of the path of motion spaced a predetermined distance along the latter and providing a series of stop abutments shaped to permit sliding motion of said slidable piece in a forward direction along said path and to check successively at each abutment rearward sliding motion of said piece back along said path, a movable lateral control slide mounted beneath said field area, means to guide said control slide in reciprocative motion along a path extending in the general direction of the path of motion of said movable piece, means to reciprocate said control slide in said guide means through a distance at least as great as the spacing of said stop abutments, and a plurality of magnetic means carried by said slide each having a magnetic attraction for the magnetic means carried by said slidable piece with said slide magnetic means extending generally transversely of the predetermined path of motion of said piece and spaced therealong.

16. An animated device comprising, in combination; means providing a lateral field area having a top surface; a slidable piece having a base to rest upon and be slid across said field area top surface; a body of magnetic material carried by said piece base; means defining a series of certainly spaced successive notches in said top surface arranged along a predetermined path of motion of said slidable piece with each having an upwardly-extending, piece motion-blocking, forwardly-facing transverse wall and a forwardly-sloping, transverse lift wall extending from the bottom of each notch to the top of the next succeeding notch, each blocking wall limiting rearward motion of said slidable piece with each lift wall permitting slide of said piece forward thereover to the next succeeding notch in step-by-step motion; a movable lateral control slide mounted beneath said field area; means to guide said control slide in reciprocative motion along a path extending generally in the same direction as does said series of successive notches; means to reciprocate said control slide back and forth along its path of motion through a distance at least as great as the certain spacing of said notches; and a plurality of transversely-extending and longitudinally-spaced magnetic means carried by said slide each having magnetic attraction for said piece base magnetic body.

17. The animated device defined in claim 16 characterized by said notches being arranged substantially in a straight line generally parallel to the direction of the path of reciprocative motion of said slide.

18. The animated device as defined in claim 16 characterized by said notches being oriented along the path of forward motion of said slidable piece in zig-zag fashion causing the latter to move transversely back and forth across the path as said piece is moved forward step-by-step.

19. The animated device as defined in claim 16 characterized by the provision of an upstanding side wall arranged along one side of said series of notches with the latter extending generally in the direction of the path of slide motion but obliquely thereof to cause said piece base to ride along in frictional contact with said side wall, said piece base being circular to roll along said side wall in forward motion.

20. An animated device comprising, in combination, means providing a lateral field area having a top surface, upstanding abutment means on said top surface defining a path of motion of a movable piece over said top surface, at least portions of said path extending toward one certain direction, a slidable piece to rest upon said top surface for step-by-step slide along the path and carrying a body of magnetic material, said upstanding abutment means including stop motion projections arranged in spaced relation along the path each so shaped and arranged as to permit forward sliding motion of said piece therealong from one to the next and with each checking reverse motion of said piece thereat, a movable lateral control slide mounted beneath said field area, means to guide said control slide in reciprocative motion along a path extending toward the certain direction, means to reciprocate said control slide along its path, and magnetic means carried by said control slide having an attraction affinity for the magnetic body in the form of laterally separated areas spaced in the general direction of the path of reciprocative motion of said control slide.

References Cited in the file of this patent

UNITED STATES PATENTS

| | | |
|---|---|---|
| 2,036,076 | Philippi | Mar. 31, 1936 |
| 2,063,536 | Baranoff | Dec. 8, 1936 |
| 2,463,795 | Neuzerling | Mar. 8, 1949 |

UNITED STATES PATENT OFFICE
CERTIFICATE OF CORRECTION

Patent No. 3,045,393            July 24, 1962

Philip H. Knott

It is hereby certified that error appears in the above numbered patent requiring correction and that the said Letters Patent should read as corrected below.

Column 6, line 9, for "is", first occurrence, read -- it --; line 23, for "forwardlly-facing" read -- forwardly-facing --; column 7, line 75, for "contract" read -- contact --; column 13, line 4, for "limits" read -- limit --; column 15, line 31, for "line" read -- lines --; column 18, line 24, for "B" read -- (B) --; line 38, for "C" read -- (C) --; line 44, for "A" read -- (A) --; column 20, line 50, for "5/6" read -- 5/8 --.

Signed and sealed this 4th day of December 1962.

(SEAL)
Attest:

ERNEST W. SWIDER            DAVID L. LADD
Attesting Officer            Commissioner of Patents